(12) United States Patent
Boucher et al.

(10) Patent No.: US 11,885,260 B2
(45) Date of Patent: Jan. 30, 2024

(54) GAS TURBINE ENGINES HAVING CRYOGENIC FUEL SYSTEMS

(71) Applicant: RTX Corporation, Farmington, CT (US)

(72) Inventors: Amanda J. L. Boucher, Boston, MA (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/894,587

(22) Filed: Aug. 24, 2022

(65) Prior Publication Data

US 2023/0128287 A1 Apr. 27, 2023

Related U.S. Application Data

(62) Division of application No. 16/864,844, filed on May 1, 2020, now abandoned.

(51) Int. Cl.
*F02C 3/22* (2006.01)
*F02C 7/06* (2006.01)
(Continued)

(52) U.S. Cl.
CPC ............... *F02C 3/22* (2013.01); *F02C 7/06* (2013.01); *F02C 7/222* (2013.01); *F02C 7/224* (2013.01); *F02C 7/36* (2013.01)

(58) Field of Classification Search
CPC ...... F02C 3/22; F02C 7/06; F02C 7/36; F02C 7/222; F02C 7/224
See application file for complete search history.

(56) References Cited

U.S. PATENT DOCUMENTS

| 3,740,949 A | 6/1973 | Wolf et al. |
| 4,062,184 A | 12/1977 | Hagen |

(Continued)

FOREIGN PATENT DOCUMENTS

EP 3048281 A1 7/2016

OTHER PUBLICATIONS

"Liquid Hydrogen as a Propulsion Fuel, 1945-1959, Part II: 1950-1957, 8. Suntan, The Model 304 Engine". Retrieved via internet: https://history.nasa.gov/SP-4404/ch8-9.htm; Apr. 30, 2020 (4 pages).

(Continued)

*Primary Examiner* — Lorne E Meade
(74) *Attorney, Agent, or Firm* — CANTOR COLBURN LLP

(57) ABSTRACT

Turbine engine systems are described. The turbine engine systems include a combustor arranged along a core flow path of the turbine engine, a cryogenic fuel tank configured to supply a fuel to the combustor, a fuel supply line having a first flow supply line and a second flow supply line, the first flow supply line fluidly connecting the cryogenic fuel tank to the combustor through a first core flow path heat exchanger, and the second flow supply line fluidly connecting the cryogenic fuel tank to the combustor through a second core flow path heat exchanger, and a flow controller arranged along the fuel supply line and configured to respectively control a flow of fuel into the first flow supply line and the second flow supply line.

18 Claims, 4 Drawing Sheets

(51) Int. Cl.
  *F02C 7/22* (2006.01)
  *F02C 7/224* (2006.01)
  *F02C 7/36* (2006.01)

(56) References Cited

U.S. PATENT DOCUMENTS

| | | | |
|---|---|---|---|
| 4,705,100 A | 11/1987 | Black et al. | |
| 5,267,608 A | 12/1993 | Coffinberry | |
| 5,984,235 A * | 11/1999 | Snowhook | B64G 1/641 |
| | | | 244/171.3 |
| 6,182,435 B1 | 2/2001 | Niggemann et al. | |
| 6,751,959 B1 | 6/2004 | McClanahan et al. | |
| 6,939,392 B2 | 9/2005 | Huang et al. | |
| 7,272,932 B2 | 9/2007 | Watson et al. | |
| 8,276,359 B2 | 10/2012 | Bondarenko et al. | |
| 8,490,917 B2 | 7/2013 | Brooks et al. | |
| 8,669,670 B2 | 3/2014 | Donnelly et al. | |
| 9,410,451 B2 | 8/2016 | Laing et al. | |
| 9,765,691 B2 | 9/2017 | Delgado et al. | |
| 2007/0089423 A1 | 4/2007 | Norman et al. | |
| 2012/0096869 A1 | 4/2012 | Kesseli et al. | |
| 2014/0000275 A1 | 1/2014 | Kesseli et al. | |
| 2014/0182264 A1 | 7/2014 | Weisgerber et al. | |
| 2015/0337730 A1 | 11/2015 | Kupiszewski et al. | |
| 2016/0025339 A1 | 1/2016 | Kamath et al. | |
| 2019/0257247 A1 | 8/2019 | Pal et al. | |
| 2020/0025081 A1 | 1/2020 | Dyer | |
| 2020/0088098 A1 | 3/2020 | Roberge | |
| 2020/0088099 A1 | 3/2020 | Roberge | |
| 2020/0088102 A1 | 3/2020 | Roberge | |
| 2021/0340908 A1 | 11/2021 | Boucher et al. | |

OTHER PUBLICATIONS

Extended European Search Report, dated Sep. 17, 2021; EP Applicaation No. 21171036.3-1007; 7 pages.

* cited by examiner

GAS TURBINE ENGINES HAVING CRYOGENIC FUEL SYSTEMS

CROSS-REFERENCE TO RELATED APPLICATIONS

This application is a division of U.S. application Ser. No. 16/864,844, filed May 1, 2020, the disclosure of which is incorporated herein by reference in its entirety.

TECHNICAL FIELD

The present disclosure relates generally to gas turbine engines, and more specifically to employing cryogenic fuel systems and related systems with gas turbine engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same byproducts as conventional hydrocarbon-based fuels. The use of liquid/compressed/supercritical hydrogen and/or methane, as a gas turbine fuel source, may require very high efficiency propulsion, in order to keep the volume of the fuel low enough to feasibly carry on an aircraft. That is, because of the added weight associated with such liquid/compressed/supercritical fuels, such as related to vessels/containers and the amount (volume) of fuel required, improved efficiencies associated with operation of the gas turbine engine may be necessary.

BRIEF SUMMARY

According to some embodiments, turbine engine systems are provided. The turbine engine systems include a combustor arranged along a core flow path of the turbine engine, a cryogenic fuel tank configured to supply a fuel to the combustor, a fuel supply line having a first flow supply line and a second flow supply line, the first flow supply line fluidly connecting the cryogenic fuel tank to the combustor through a first core flow path heat exchanger, and the second flow supply line fluidly connecting the cryogenic fuel tank to the combustor through a second core flow path heat exchanger, and a flow controller arranged along the fuel supply line and configured respectively to control a flow of fuel into the first flow supply line and the second flow supply line.

In addition to one or more of the features described above, or as an alternative, embodiments of the turbine engine systems may include that the first core flow path heat exchanger includes a waste heat recovery heat exchanger arranged proximate a core nozzle of the core flow path.

In addition to one or more of the features described above, or as an alternative, embodiments of the turbine engine systems may include that the second core flow path heat exchanger includes an intercooler heat exchanger arranged between a low pressure compressor and a high pressure compressor of the core flow path.

In addition to one or more of the features described above, or as an alternative, embodiments of the turbine engine systems may include that the second core flow path heat exchanger includes a pre-cooler heat exchanger arranged upstream of a low pressure compressor of the core flow path.

In addition to one or more of the features described above, or as an alternative, embodiments of the turbine engine systems may include a power electronics cooling heat exchanger arranged along the fuel supply line and configured to cool a working fluid associated with power electronics.

In addition to one or more of the features described above, or as an alternative, embodiments of the turbine engine systems may include that the power electronics cooling heat exchanger is arranged between the cryogenic fuel tank and the flow controller.

In addition to one or more of the features described above, or as an alternative, embodiments of the turbine engine systems may include a supplemental cooling heat exchanger arranged along the fuel supply line and configured to cool at least one of engine oil, environmental control system fluids, and cooled cooling air fluids.

In addition to one or more of the features described above, or as an alternative, embodiments of the turbine engine systems may include that the supplemental cooling heat exchanger is arranged between the cryogenic fuel tank and the flow controller.

In addition to one or more of the features described above, or as an alternative, embodiments of the turbine engine systems may include an expansion turbine configured to receive fuel from at least one of the first flow supply line and the second flow supply line downstream of the respective first core flow path heat exchanger and second core flow path heat exchanger and upstream of the combustor.

In addition to one or more of the features described above, or as an alternative, embodiments of the turbine engine systems may include that the expansion turbine is configured to generate work.

In addition to one or more of the features described above, or as an alternative, embodiments of the turbine engine systems may include at least one additional heat exchanger arranged between the expansion turbine and the combustor.

In addition to one or more of the features described above, or as an alternative, embodiments of the turbine engine systems may include that the at least one additional heat exchanger includes a supplemental cooling heat exchanger arranged along the fuel supply line and configured to cool at least one of engine oil, environmental control system fluids, and cooled cooling air fluids.

In addition to one or more of the features described above, or as an alternative, embodiments of the turbine engine systems may include that the at least one additional heat exchanger includes a power electronics heat cooling heat exchanger.

In addition to one or more of the features described above, or as an alternative, embodiments of the turbine engine systems may include that the fuel includes liquid, compressed, or supercritical hydrogen or methane.

In addition to one or more of the features described above, or as an alternative, embodiments of the turbine engine systems may include that the core flow path includes a fan, a low pressure compressor, a high pressure compressor, a high pressure turbine, and a low pressure turbine. The fan, low pressure compressor, and high pressure compressor are arranged upstream of the combustor along the core flow path and the high pressure turbine and the low pressure turbine are arranged downstream of the combustor along the core flow path.

Accordingly to some embodiments, propulsion systems are provided that include an auxiliary power unit and a turbine system in accordance with one or more of the above features. The fuel supply line includes a third flow supply line fluidly connecting the cryogenic fuel tank to the auxiliary power unit to supply fuel to the auxiliary power unit.

In addition to one or more of the features described above, or as an alternative, embodiments of the propulsion systems may include that the auxiliary power unit includes a combustor configured to receive the fuel.

In addition to one or more of the features described above, or as an alternative, embodiments of the propulsion systems may include that the auxiliary power unit includes a fuel cell configured to receive the fuel.

In addition to one or more of the features described above, or as an alternative, embodiments of the propulsion systems may include a water tank configured to receive water from the fuel cell.

In addition to one or more of the features described above, or as an alternative, embodiments of the propulsion systems may include a secondary flow controller configured to divert a portion of fuel that flows along at least one of the first or second flow supply lines to the auxiliary power unit.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
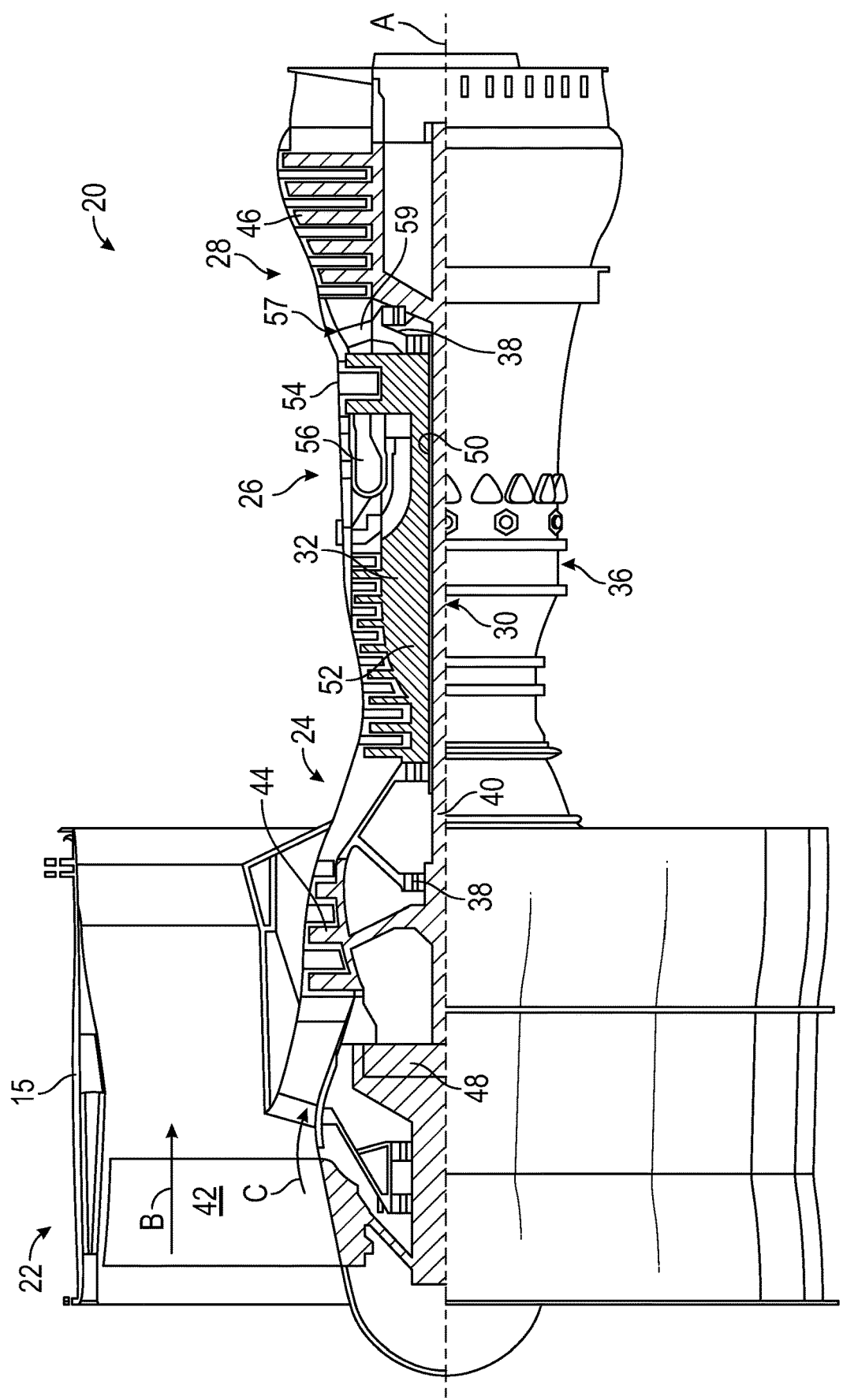
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a nacelle 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow. It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans or turboshafts.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy, and can be a large source of inefficiency in gas turbine engines.

Figure 2:
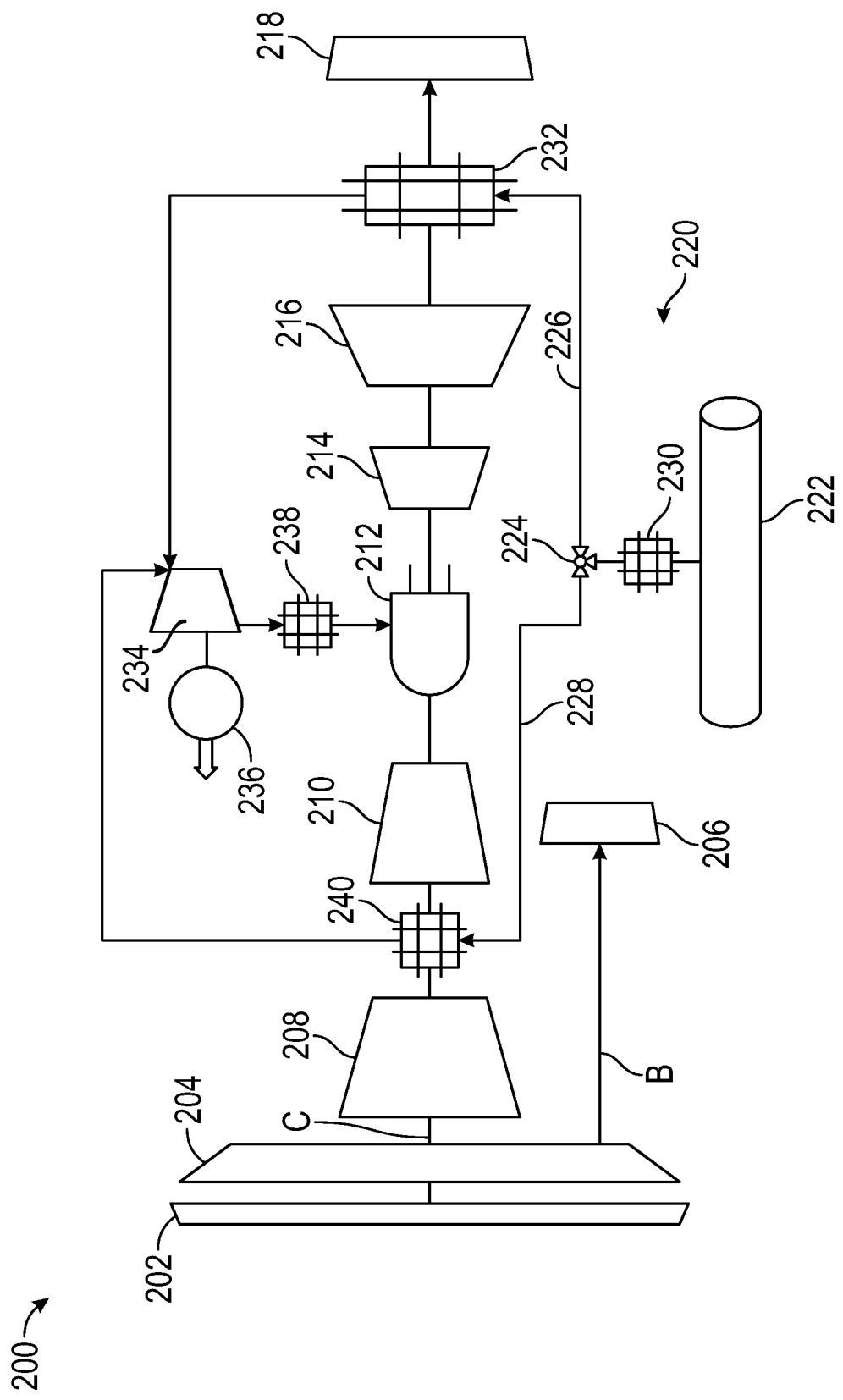
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above, but is configured to employ a non-hydrocarbon fuel source, such as liquid/compressed/supercritical hydrogen and/or methane, or other types of cryogenic fuels, as will be appreciated by those of skill in the art. The turbine engine system 200 includes an inlet 202, a fan 204 with a fan nozzle 206, a low pressure compressor 208, a high pressure compressor 210, a combustor 212, a high pressure turbine 214, a low pressure turbine 216, and a core nozzle 218. A core flow path C is defined through, at least, the compressor, turbine, and combustor sections, and a bypass flow path B may defined in a bypass duct defined in a nacelle, as described above, between the fan 204 and the fan nozzle 206.

As shown, the turbine engine system 200 includes a cryogenic fuel system 220. The cryogenic fuel system 220 is configured to supply a fuel from a cryogenic fuel tank 222 to the combustor 212. In this illustrative embodiment, the fuel may be supplied from the cryogenic fuel tank 222 to the combustor 212 through a multi-path fuel supply line. The multi-path fuel supply line may be split at a flow controller 224 into a first flow supply line 226 and a second flow supply line 228. For example, the flow controller 224 may be controlled to direct a fuel from the cryogenic fuel tank 222 through the first flow supply line 226 for certain operational parameters and through the second flow supply line 228 for other operational parameters. Such control can provide efficient operation of the turbine engine system 200 and/or systems operably connected thereto. As shown, between the cryogenic fuel tank 222 and the flow controller 224 may be an optional power electronics cooling heat exchanger 230. The power electronics cooling heat exchanger 230 may receive the cryogenic fuel directly from the cryogenic fuel tank 222 as a first fluid and a power electronics working fluid for power electronics of the turbine engine system 200 (or other aircraft power electronics) as a second fluid. A relatively hot power electronics working fluid can pass through the power electronics cooling heat exchanger 230 and heat therefrom may be transferred into the cryogenic fuel. This may serve, in some configurations, to begin raising a temperature of the cryogenic fuel to a desired temperature necessary for efficient combustion in the combustor 212.

When the fuel is directed through the first flow supply line 226, the fuel will pass through a first core flow path heat exchanger 232 (e.g., an exhaust waste heat recovery heat exchanger). The first core flow path heat exchanger 232 is arranged in the core flow path C downstream of the combustor 212, and in some embodiments, downstream of the low pressure turbine 216. In this illustrative embodiment, the first core flow path heat exchanger 232 is arranged downstream of the low pressure turbine 216 and at or proximate the core nozzle 218. As the fuel passes through the first core flow path heat exchanger 232, the fuel will pick up heat from the exhaust of the turbine engine system 200. As such, the temperature of the cryogenic fuel will be increased.

The heated fuel will then be passed into an expansion turbine 234. As the fuel passes through the expansion turbine 234 the fuel will be expanded and may drive a power shaft 236 to generate power or drive mechanical operation of a component (e.g., a fan). The expanded fuel may then pass through an optional supplemental cooling heat exchanger 238. The supplemental cooling heat exchanger 238 receives the heated (but potentially still relatively cold) fuel as a first fluid and as the second fluid may receive one or more aircraft system fluids, such as, without limitation, engine oil, environmental control system fluids, or cooled cooling air fluids. As such, the fuel will be heated as the other fluid may be cooled. The fuel will then be injected into the combustor 212 through one or more fuel injectors, as will be appreciated by those of skill in the art. Because the fuel is heated from the cryogenic state in the cryogenic fuel tank 222 through the various mechanisms along the first flow supply line 226, the combustion efficiency may be improved.

In contrast, when the fuel is directed along the second flow supply line 228, the fuel will pass through a second core flow path heat exchanger 240 (e.g., an intercooler heat exchanger). The second core flow path heat exchanger 240 is arranged in the core flow path C between the low pressure compressor 208 and the high pressure compressor 210. The flow controller 224 may be configured and/or controlled to direct the fuel through the second flow supply line 228 and the second core flow path heat exchanger 240 during certain conditions. For example, the flow controller 224 may direct the fuel to the second core flow path heat exchanger 240 during take-off and climb flight conditions of an aircraft.

Figure 3:
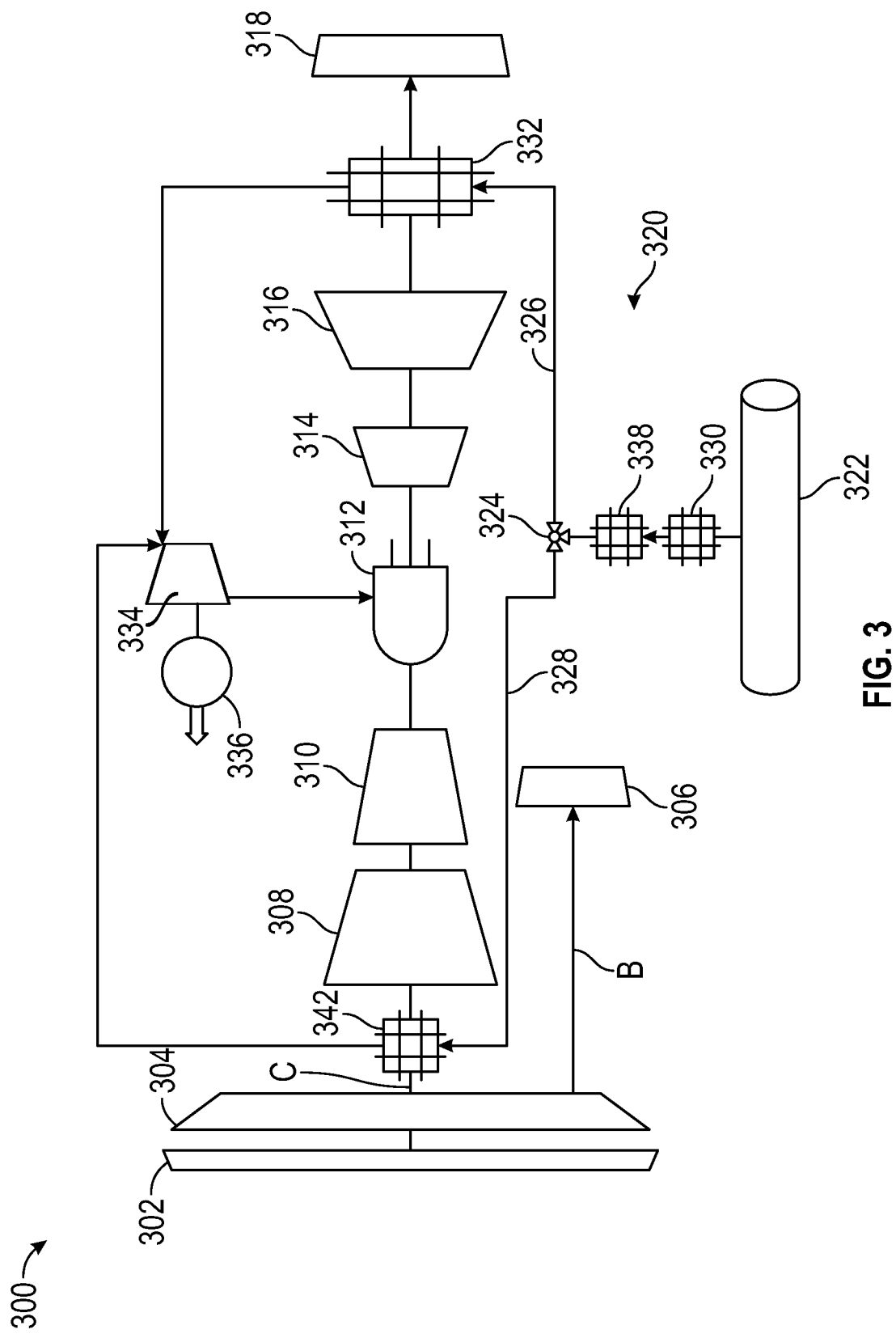
FIG. 3 is a schematic illustration of a turbine engine system in accordance with an embodiment of the present disclosure that employs a non-hydrocarbon fuel source.

Turning now to FIG. 3, a schematic diagram of a turbine engine system 300 in accordance with an embodiment of the present disclosure is shown. The turbine engine system 300 may be similar to that shown and described above and, like the configuration of FIG. 2, is configured to employ a non-hydrocarbon fuel source, such as liquid/compressed/supercritical hydrogen and/or methane, or other types of cryogenic fuels, as will be appreciated by those of skill in the art. The turbine engine system 300 includes an inlet 302, a fan 304 with a fan nozzle 306, a low pressure compressor 308, a high pressure compressor 310, a combustor 312, a high pressure turbine 314, a low pressure turbine 316, and a core nozzle 318. A core flow path C is defined through, at least, the compressor, turbine, and combustor sections, and a bypass flow path B may defined in a bypass duct defined in a nacelle, as described above, between the fan 304 and the fan nozzle 306.

As shown, the turbine engine system 300 includes a cryogenic fuel system 320. The cryogenic fuel system 320 is configured to supply a fuel from a cryogenic fuel tank 322 to the combustor 312. In this illustrative embodiment, the fuel may be supplied from the cryogenic fuel tank 322 to the combustor 312 through a multi-path fuel supply line. The multi-path fuel supply line may be split at a flow controller 324 into a first flow supply line 326 and a second flow supply line 328. For example, the flow controller 324 may be controlled to direct a fuel from the cryogenic fuel tank 322 through the first flow supply line 326 for certain operational parameters and through the second flow supply line 328 for other operational parameters. Such control can provide efficient operation of the turbine engine system 300 and/or systems operably connected thereto. As shown, between the cryogenic fuel tank 322 and the flow controller 324 may be an optional power electronics cooling heat exchanger 330 and, in this configuration, an optional supplemental cooling heat exchanger 338, which may be similarly configured as that described above. Accordingly, in this configuration, the cold fuel will pass through the two optional heat exchangers 330, 338 prior to being directed by the flow controller 324. These optional heat exchangers 330, 338 may serve to pre-heat or pre-warm the fuel prior to further thermal management of the fuel, as described herein.

When the fuel is directed through the first flow supply line 326, the fuel will pass through a first core flow path heat exchanger 332 (e.g., exhaust waste heat recovery heat exchanger). The first core flow path heat exchanger 332 is arranged in the core flow path C downstream of the combustor 312, similar to the configuration in FIG. 2. When the fuel is directed along the second flow supply line 328, the fuel will pass through a second core flow path heat exchanger 342 (e.g., a pre-cooler heat exchanger). The second core flow path heat exchanger 342 is arranged in the core flow path C upstream of the low pressure compressor 308. The flow controller 324 may be configured and/or controlled to direct the fuel through the second flow supply line 328 and the second core flow path heat exchanger 342 during certain conditions. For example, the flow controller 324 may direct the fuel to the second core flow path heat exchanger 342 during take-off and climb flight conditions of an aircraft.

After passing through one of the first core flow path heat exchanger 332 or the second core flow path heat exchanger 342, the heated fuel will then be passed into an expansion turbine 334, similar to that described above. As the fuel passes through the expansion turbine 334 the fuel will be expanded and may drive a power shaft 336 to generate power or drive mechanical operation of a component (e.g., a fan). The fuel will then be injected into the combustor 312 through one or more fuel injectors, as will be appreciated by those of skill in the art. Because the fuel is heated from the cryogenic state in the cryogenic fuel tank 322 through the various mechanisms along the first and second flow supply lines 326, 328, the combustion efficiency may be maintained.

It is noted that in the configurations shown in FIGS. 2-3, specific arrangements of components are shown and described. However, it will be appreciated by those of skill in the art that various other arrangements are possible, without departing from the scope of the present disclosure. It is noted that one or more optional heat exchangers can provide various cooling to fluids of other engine and/or aircraft systems. For example, as described, a heat exchanger can be provided to cryogenically cool power electronics by the fuel, adding some heat to the fuel before recovering heat from another source in the turbine engine (e.g., a source along the core flow path C, referred to herein as core flow path heat exchangers). As described, a heat exchanger can be provided to cool the engine oil, aircraft ECS needs, and/or cooled cooling air, downstream of the expansion turbine prior to being injected into the combustor. Alternatively, an aircraft ECS cooler heat exchanger could be arrange between the cryogenic power electronics cooler and the core flow path heat exchangers. The engine oil cooler or cooled cooling air heat exchangers could alternatively be between the core flow path heat exchangers and expansion turbine. Additionally, it will be appreciated that the additional embodiments and configurations described below may also be rearranged and/or components may be combined from various embodiments to form a system not explicitly shown, but in line with the present disclosure and the various embodiments described herein. For example, one or more pumps for working fluids and/or fuels may be employed in the flow lines, as will be appreciated by those of skill in the art. As such, no specific or individual shown or described embodiment is to be limiting, but rather is provided for illustrative and explanatory purposes only.

In some embodiments, the flow controller of the systems may be configured to allow for a portion of the fuel to flow along one of the two flow paths and another portion to flow along the other of the two flow paths. In some such configurations, the two separated flows may be recombined and mixed together prior to or at the point of entering the expansion turbine. That is, the flow controller may be dynamically controlled to ensure a desired temperature of the fuel at the point of injection into the combustor of the turbine engine. It is noted that the two core flow path heat exchangers can supply different amounts of heat pickup to the fuel. As such, a transition from one flow path to another may be possible to provide a more precise control of the fuel temperature at the point of injection into the combustor. In some embodiments, the control of fuel along one or another of the flow paths allows for dynamic control to improve or optimize engine power requirements throughout a flight (e.g., take-off, climb, cruise, descent, landing).

During take-off and climb flight operations, more thrust is required than that required at cruise. Embodiments of the present disclosure allow for pre-cooling or inter-cooling of the air, which in turn allows for an increase in power output, resulting in an increased thrust. Thrust may be more important than thermal efficiency for take-off because this flight condition is not sustained for a long period of time and the increased thrust improves take-off performance. At a cruise conditions, less thrust is required and thermal efficiency may be more important. As such, converting heat into useful power is beneficial. With pre-cooling (e.g., second core flow path heat exchanger 342) or inter-cooling (e.g., second core flow path heat exchanger 240), as provided by embodiments of the present disclosure, a smaller engine (e.g., smaller core) can be used for flight, and still meet thrust requirements for take-off. That is, the gas turbine engine can be sized more optimally for cruise conditions (e.g., large enough for cruise thrust requirement, but as small as possible to enable a reduction in weight/fuel burn). In one example configuration, an engine having systems as described herein may have two operating modes (e.g., pre/inter-cooling vs. exhaust cooling) when power level drops below 100% and atmospheric temperatures are sufficient for cooling purposes (e.g., less than standard day temperatures). In other words, when the power required for the condition (ex: mid or top of cruise) is less than the power that the engine can produce with 100% of the fuel going to pre/inter-cooling, then the fuel can be diverted to the waste heat recovery heat exchanger (e.g., first core flow path heat exchanger 232, 332). However, when at cruise (e.g., lowest power required, coldest atmospheric temperatures), 100% fuel may be employed to extract the heat from the exhaust (e.g., first core flow path heat exchanger 232, 332), which can increase thermal efficiency and relatively reduce fuel burn.

Figure 4:
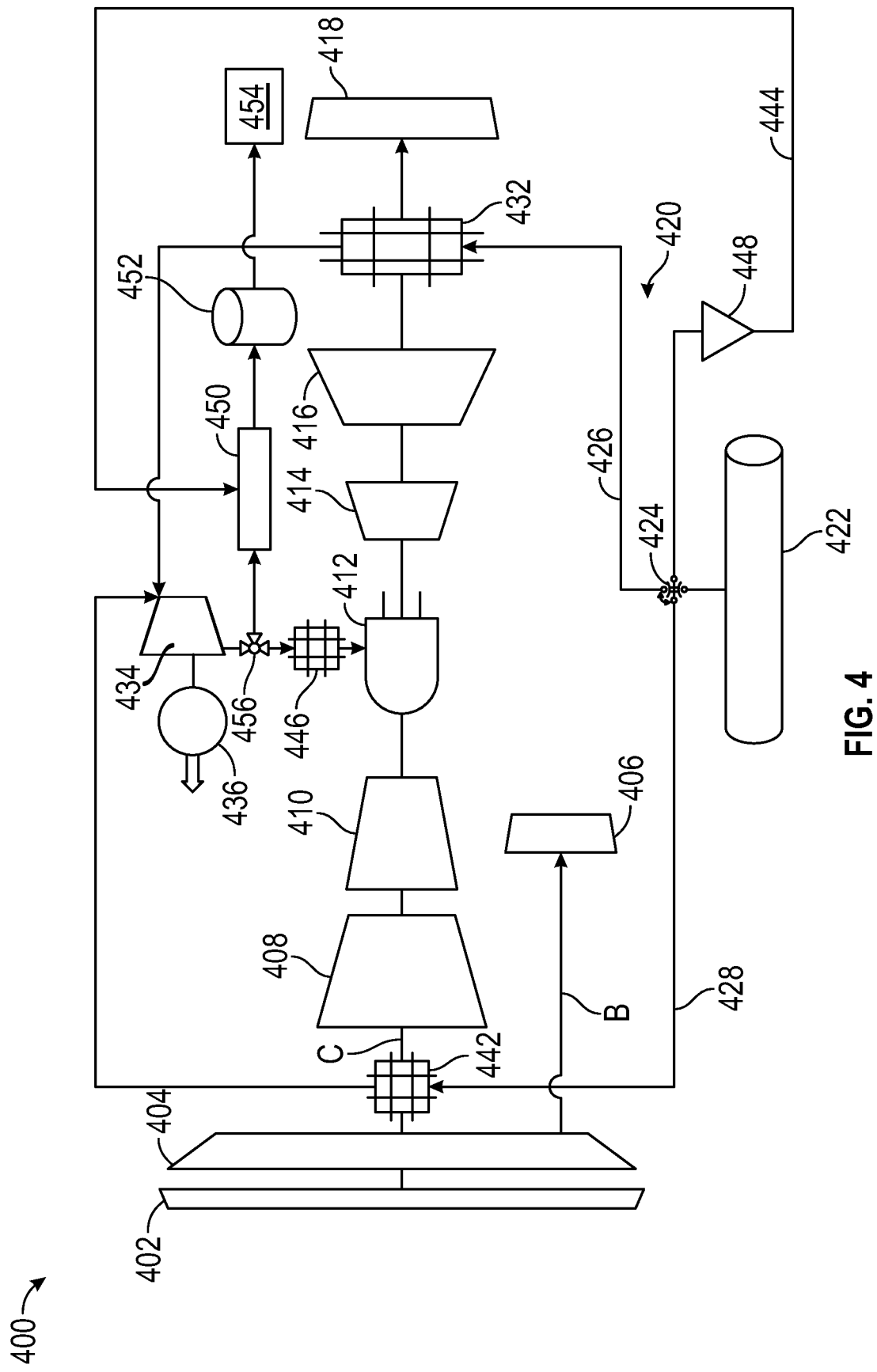
FIG. 4 is a schematic illustration of a turbine engine system in accordance with an embodiment of the present disclosure that employs a non-hydrocarbon fuel source.

Turning now to FIG. 4, a schematic diagram of a turbine engine system 400 in accordance with an embodiment of the present disclosure is shown. The turbine engine system 400 may be similar to that shown and described above and is configured to employ a non-hydrocarbon fuel source, such as liquid/compressed/supercritical hydrogen and/or methane, or other types of cryogenic fuels, as will be appreciated by those of skill in the art. The turbine engine system 400 includes an inlet 402, a fan 404 with a fan nozzle 406, a low pressure compressor 408, a high pressure compressor 410, a combustor 412, a high pressure turbine 414, a low pressure turbine 416, and a core nozzle 418. A core flow path C is defined through, at least, the compressor, turbine, and combustor sections, and a bypass flow path B may defined in a bypass duct defined in a nacelle, as described above, between the fan 404 and the fan nozzle 406.

As shown, the turbine engine system 400 includes a cryogenic fuel system 420. The cryogenic fuel system 420 is configured to supply a fuel from a cryogenic fuel tank 422 to the combustor 412. In this illustrative embodiment, the fuel may be supplied from the cryogenic fuel tank 422 to the combustor 412 through a multi-path fuel supply line. In this embodiment, the multi-path fuel supply line may be split at a flow controller 424 into a first flow supply line 426, a second flow supply line 428, and a third flow supply line 444. For example, the flow controller 424 may be controlled to direct a fuel from the cryogenic fuel tank 422 through the first flow supply line 426 for certain operational parameters, through the second flow supply line 428 for other operational parameters, and through the third flow supply line 444 for other operational parameters. Such control can provide efficient operation of the turbine engine system 400 and/or systems operably connected thereto.

When the fuel is directed through the first flow supply line 426, the fuel will pass through a first core flow path heat exchanger 432 (e.g., exhaust waste heat recovery heat exchanger). The first core flow path heat exchanger 432 is arranged in the core flow path C downstream of the combustor 412. When the fuel is directed along the second flow supply line 428, the fuel will pass through a second core flow path heat exchanger 442 (e.g., shown as a pre-cooler heat exchanger, although an intercooler heat exchanger may alternatively be employed). After passing through one of the first core flow path heat exchanger 432 or the second core flow path heat exchanger 442, the heated fuel will then be passed into an expansion turbine 434, similar to that described above. As the fuel passes through the expansion turbine 434 the fuel will be expanded and may drive a power shaft 436 to generate power or drive mechanical operation of a component (e.g., a fan). Subsequent to the expansion turbine 434, in this illustrative embodiment, the fuel may pass through an optional heat exchanger 446, similar to the additional heat exchangers described above (e.g., powered electronics, ECS, cooled cooling air, engine oil, etc.). The fuel will then be injected into the combustor 412 through one or more fuel injectors, as will be appreciated by those of skill in the art. Because the fuel is heated from the cryogenic state in the cryogenic fuel tank 422 through the various mechanisms along the first and second flow supply lines 426, 428, the combustion efficiency may be maintained.

As noted, a third flow supply line 444 is provided in the turbine engine system 400 of FIG. 4. The third flow supply line 444 may be employed when the engine is in an off state (e.g., the combustor 412 is not actively combusting fuel). In the third flow supply line 444, the fuel from the cryogenic fuel tank 422 may be directed by the flow controller 424 to a regulator 448. The regulator 448 may be a pressure and/or temperature regulator that can condition the fuel as it flows along the third flow supply line 444. The fuel does not pass through the core flow path C because the turbine engine is not on. Rather, in this configuration, the fuel may be directed to an auxiliary power unit (APU) 450. The auxiliary power unit 450 may be a fuel cell APU (as shown) or as a Brayton cycle system (e.g., combustion with a turbine). The fuel may then be used as a reactant in a fuel cell APU configuration or a combustion fuel for a Brayton cycle system, as will be appreciated by those of skill in the art. In the illustrative fuel cell APU configuration, after catalyzing in the fuel cell, water may be output and directed to a water tank 452. The water may then be captured to be used for injection into a Brayton cycle system (e.g., combustion system) at a condition such as take-off when more engine power is required, or supply water to the aircraft, or may be exhausted overboard 454.

In some configurations, and as shown in FIG. 4, a secondary flow controller 456 can be provided downstream from the expansion turbine 434 and upstream of the combustor 412. The secondary flow controller 456 may be configured and controlled to divert a portion of the fuel that flows along either of the first and/or second flow supply lines 426, 428 to be supplied to the APU 450 for use when the engine is on.

Advantageously, embodiments of the present disclosure are directed to improved turbine engine systems that employ non-hydrocarbon fuels at cryogenic temperatures. In accordance with some embodiments, the systems described herein may allow the cryogenic fuel to recover heat from various systems, depending on the flight segment, providing a more optimized combined system throughout the flight envelope and on the ground. The intercooling or pre-cooling, in accordance with some embodiments, allows for a smaller gas turbine core to achieve thrust requirements, and the waste heat recovery can allow for increased combined thermal efficiency at cruise, reducing overall fuel burn. Advantageously, in accordance with some embodiments of the present disclosure, the integration of an APU with a cryogenic fuel propulsion system with adaptive heat extraction allows for additional thermal control and additional power onboard an aircraft. Moreover, by using a fuel cell APU, the cryogenic fuel becomes dual-use for the main turbine engine and an aircraft auxiliary power unit. This potentially allows for the removal of all additional aircraft power needs and bleeds from the main turbine engine. In some such embodiments, the fuel cell waste water can serve as a clean water source that can be injected during take-off/climb conditions for thrust augmentation. These changes allow the main turbine engine to be designed with a smaller core and higher thermal efficiency, leading to a smaller cryogenic fuel tank requirements.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A propulsion system, comprising:
a turbine engine having a combustor arranged along a core flow path of the turbine engine;
an auxiliary power unit;
a cryogenic fuel tank configured to supply a fuel to at least one of the combustor and the auxiliary power unit;
a fuel supply line having a first flow supply line, a second flow supply line, and a third flow supply line, wherein the first flow supply line fluidly connects the cryogenic fuel tank to the combustor through a first core flow path heat exchanger, the second flow supply line fluidly connects the cryogenic fuel tank to the combustor through a second core flow path heat exchanger, and the third flow supply line fluidly connects the cryogenic fuel tank to the auxiliary power unit to supply fuel to the auxiliary power unit;
a first flow controller arranged along the fuel supply line and configured to respectively control a flow of fuel into at least one of the first flow supply line during a first operational parameter of the propulsion system, the second flow supply line during a second operational parameter of the propulsion system that is different from the first operational parameter, and the third flow supply line during a first third operational parameter of the propulsion system that is different from the first operational parameter and the second operational parameter,
an expansion turbine configured to receive fuel from at least one of the first flow supply line and the second flow supply line downstream of the respective first core flow path heat exchanger and second core flow path heat exchanger and upstream of the combustor; and
a second flow controller arranged between the expansion turbine and the combustor and configured to selectively divert at least a portion of fuel that exits the expansion turbine to the auxiliary power unit.

2. The propulsion system of claim 1, wherein the first core flow path heat exchanger is a waste heat recovery heat exchanger arranged downstream form the combustor and proximate a core nozzle at an outlet of the core flow path.

3. The propulsion system of claim 1, wherein the second core flow path heat exchanger is an intercooler heat exchanger arranged upstream from the combustor and between a low pressure compressor and a high pressure compressor arranged along the core flow path.

4. The propulsion system of claim 1, wherein the second core flow path heat exchanger is a pre-cooler heat exchanger arranged upstream of a low pressure compressor arranged along the core flow path upstream from the combustor.

5. The propulsion system of claim 1, further comprising a power electronics cooling heat exchanger arranged along the fuel supply line and configured to cool a working fluid associated with power electronics.

6. The propulsion system of claim 5, wherein the power electronics cooling heat exchanger is arranged between the cryogenic fuel tank and the first flow controller.

7. The propulsion system of claim 5, wherein the power electronics cooling heat exchanger is arranged along the fuel supply line downstream from each of the first core flow path heat exchanger and the second core flow path heat exchanger.

8. The propulsion system of claim 1, further comprising a supplemental cooling heat exchanger arranged along the fuel supply line and configured to cool at least one of engine oil, environmental control system fluids, and cooled cooling air fluids.

9. The propulsion system of claim 8, wherein the supplemental cooling heat exchanger is arranged between the cryogenic fuel tank and the first flow controller.

10. The propulsion system of claim 1, wherein the expansion turbine is configured to generate work.

11. The propulsion system of claim 1, further comprising at least one additional heat exchanger arranged between the expansion turbine and the combustor.

12. The propulsion system of claim 11, wherein the at least one additional heat exchanger is a supplemental cooling heat exchanger arranged along the fuel supply line and configured to cool at least one of engine oil, environmental control system fluids, and cooled cooling air fluids.

13. The propulsion system of claim 11, wherein the at least one additional heat exchanger includes a power electronics heat cooling heat exchanger.

14. The propulsion system of claim 1, wherein the fuel includes liquid, compressed, or supercritical hydrogen or methane.

15. The propulsion system of claim 1, wherein the turbine engine includes:
- a fan, a low pressure compressor, a high pressure compressor, a high pressure turbine, and a low pressure turbine arranged sequentially along the core flow path,
- wherein the fan, the low pressure compressor, and the high pressure compressor are arranged upstream of the combustor along the core flow path and the high pressure turbine and the low pressure turbine are arranged downstream of the combustor along the core flow path.

16. The propulsion system of claim 1, wherein the auxiliary power unit includes a combustor configured to receive the fuel.

17. The propulsion system of claim 1, wherein the auxiliary power unit includes a fuel cell configured to receive the fuel.

18. The propulsion system of claim 17, further comprising a water tank configured to receive water from the fuel cell.

\* \* \* \* \*